(12) United States Patent
Ford et al.

(10) Patent No.: US 10,275,111 B2
(45) Date of Patent: Apr. 30, 2019

(54) DIGITAL SIGN NETWORK

(71) Applicant: Texas Emergency Network, LLC, Austin, TX (US)

(72) Inventors: Curtis E. Ford, Austin, TX (US); Drew Cartwright, Austin, TX (US)

(73) Assignee: Texas Emergency Network, LLC, Austin, TX (US)

( * ) Notice: Subject to any disclaimer, the term of this patent is extended or adjusted under 35 U.S.C. 154(b) by 0 days.

(21) Appl. No.: 15/876,670

(22) Filed: Jan. 22, 2018

(65) Prior Publication Data

US 2018/0143742 A1    May 24, 2018

Related U.S. Application Data

(63) Continuation of application No. 15/583,986, filed on May 1, 2017, now Pat. No. 9,874,993, which is a continuation of application No. 14/980,773, filed on Dec. 28, 2015, now Pat. No. 9,639,233, which is a continuation of application No. 13/896,915, filed on May 17, 2013, now Pat. No. 9,221,385.

(60) Provisional application No. 61/649,120, filed on May 18, 2012.

(51) Int. Cl.
| | |
|---|---|
| *G06F 3/0481* | (2013.01) |
| *B60Q 1/00* | (2006.01) |
| *G09F 9/00* | (2006.01) |
| *G08G 1/054* | (2006.01) |
| *G08G 1/16* | (2006.01) |
| *G09F 27/00* | (2006.01) |
| *G06F 3/00* | (2006.01) |
| *B60C 1/00* | (2006.01) |

(52) U.S. Cl.
CPC ............. *G06F 3/0481* (2013.01); *B60C 1/00* (2013.01); *B60Q 1/00* (2013.01); *G06F 3/005* (2013.01); *G08G 1/054* (2013.01); *G08G 1/16* (2013.01); *G09F 9/00* (2013.01); *G09F 27/00* (2013.01)

(58) Field of Classification Search
CPC .......... G06Q 30/02; G09F 9/35; G06F 3/481; G06F 3/005
See application file for complete search history.

(56) References Cited

U.S. PATENT DOCUMENTS

| | | | |
|---|---|---|---|
| 6,169,476 B1 | 1/2001 | Flanagan | |
| 7,038,637 B1 * | 5/2006 | Eller | G06Q 30/02 345/2.1 |
| 7,151,565 B1 | 12/2006 | Wada et al. | |

(Continued)

*Primary Examiner* — Obafemi O Sosanya
(74) *Attorney, Agent, or Firm* — Meyertons, Hood, Kivlin, Kowert & Goetzel, P.C.

(57) ABSTRACT

The disclosed subject matter provides a digital sign with a video camera. The digital sign and video camera are connected via a communications medium to a central computer. The central computer provides a way of changing the images displayed on the digital sign and of disseminating the video from the video camera either through real time forwarding/viewing or recording the real time video stream and playing back the recorded video to a user. The central computer also provides a user interface where an authorized user, which would normally include an authorized governmental entity, can view the video stream and unilaterally interrupt the normally displayed image (or series of images) with an emergency notification message that would display on the digital sign.

20 Claims, 11 Drawing Sheets

(56) References Cited

U.S. PATENT DOCUMENTS

| | | |
|---|---|---|
| 7,233,781 B2 | 6/2007 | Hunter et al. |
| 7,936,397 B2 | 5/2011 | Tung et al. |
| 8,249,545 B2 | 8/2012 | Dolezal et al. |
| 2003/0069002 A1 | 4/2003 | Hunter et al. |
| 2003/0126013 A1* | 7/2003 | Shand .................... G06Q 30/02 705/14.52 |
| 2003/0193394 A1 | 10/2003 | Lamb |
| 2005/0128070 A1 | 6/2005 | Faltesek et al. |
| 2006/0119535 A1 | 6/2006 | Van Fossan |
| 2006/0130100 A1 | 6/2006 | Pentland |
| 2007/0252688 A1 | 11/2007 | Eisold et al. |
| 2008/0098305 A1 | 4/2008 | Beland |
| 2009/0028318 A1 | 1/2009 | Bhogal et al. |
| 2009/0138353 A1 | 5/2009 | Mendelson |
| 2009/0144157 A1* | 6/2009 | Saracino ................ G06Q 30/02 705/14.73 |
| 2009/0177528 A1* | 7/2009 | Wu ........................ G06Q 30/02 705/14.44 |
| 2010/0020752 A1* | 1/2010 | Anschutz ............... G06Q 30/02 370/328 |
| 2010/0090856 A1 | 4/2010 | Chen |
| 2011/0094184 A1 | 4/2011 | Gu et al. |
| 2011/0169634 A1 | 7/2011 | Raj et al. |
| 2011/0298841 A1* | 12/2011 | Fujimori ................... G09F 9/35 345/690 |

\* cited by examiner

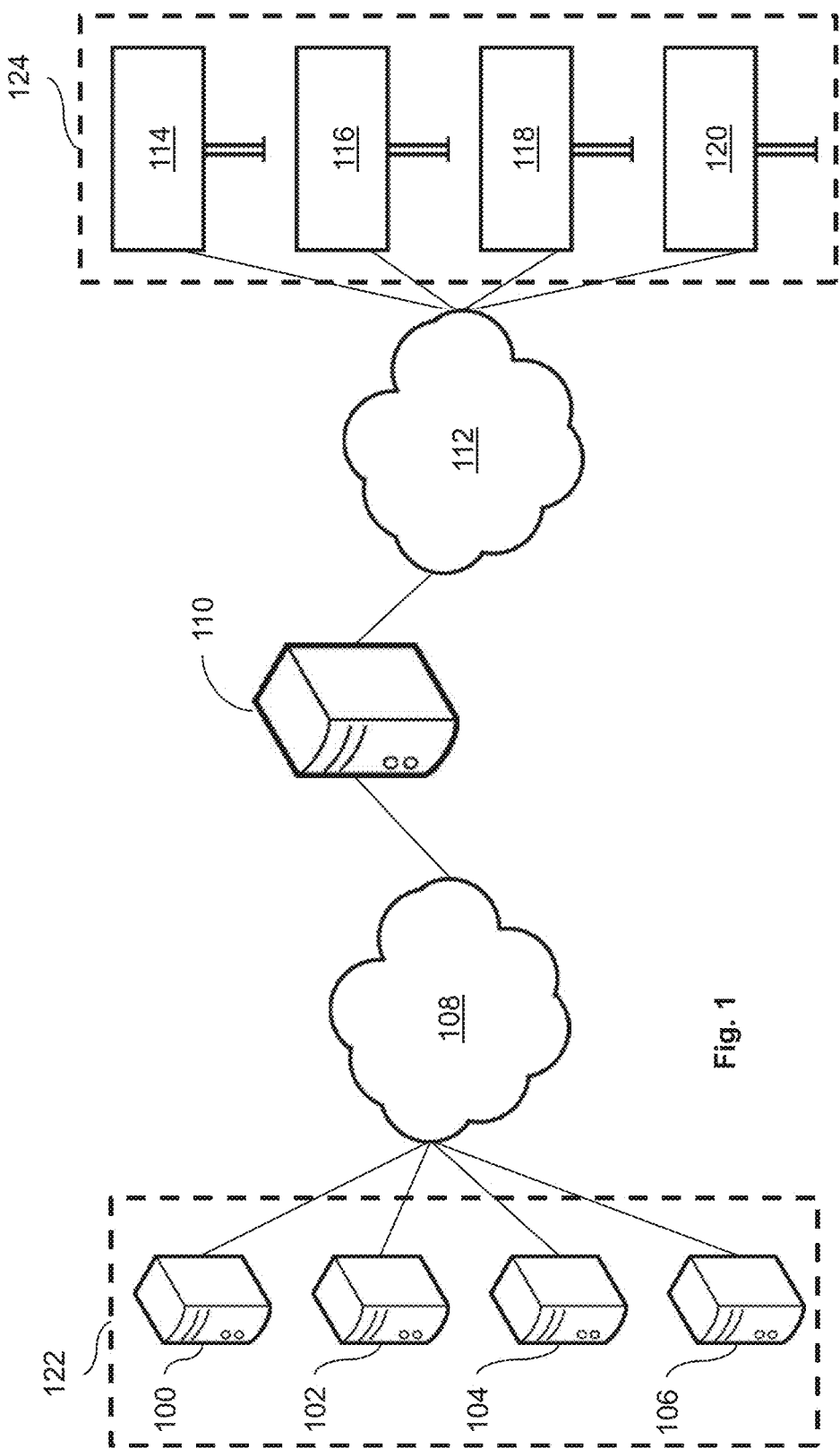

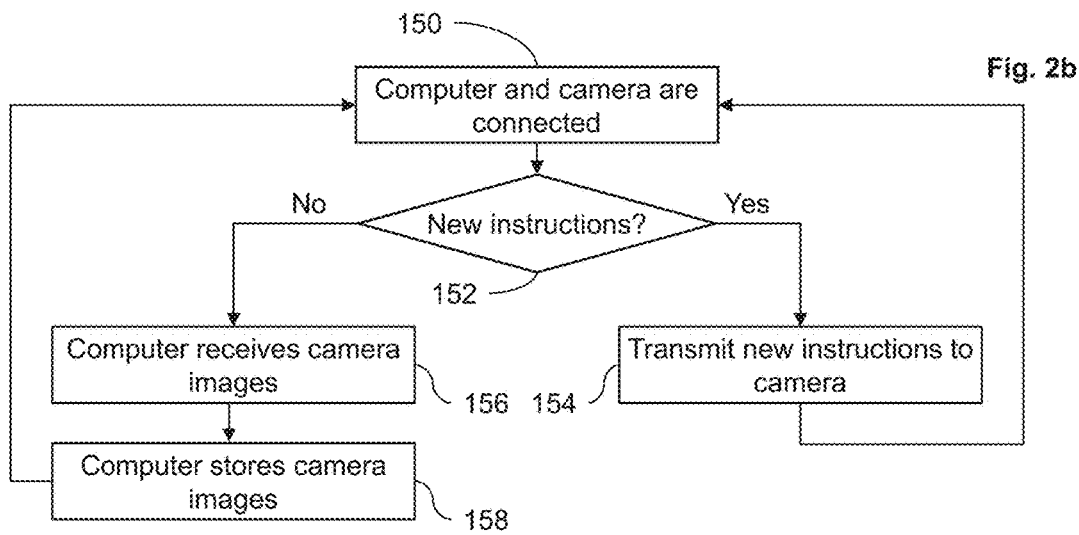
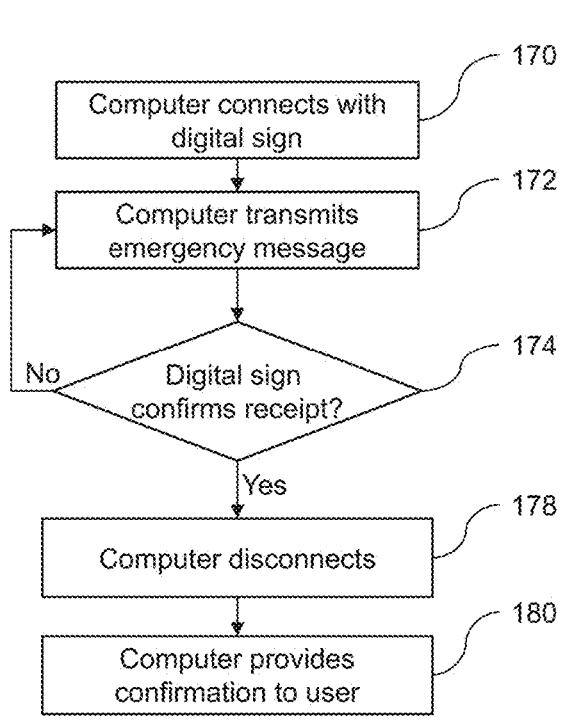

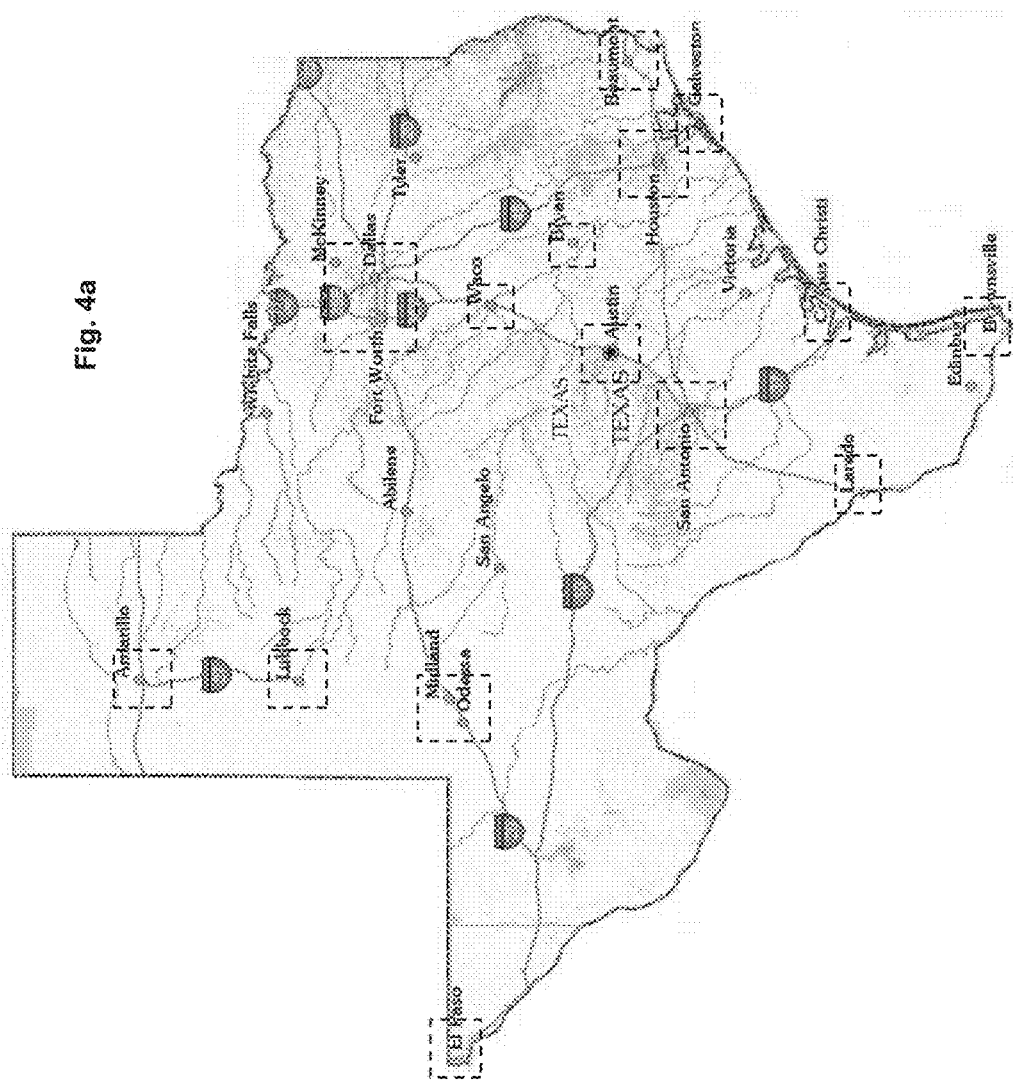

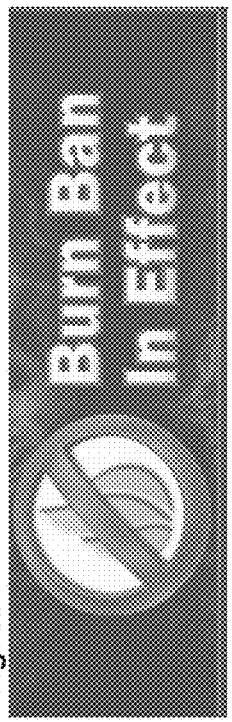
Fig. 5b
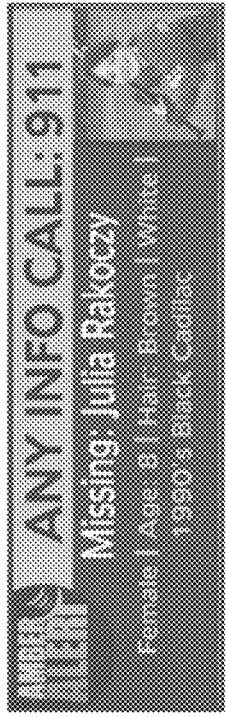
Fig. 5d
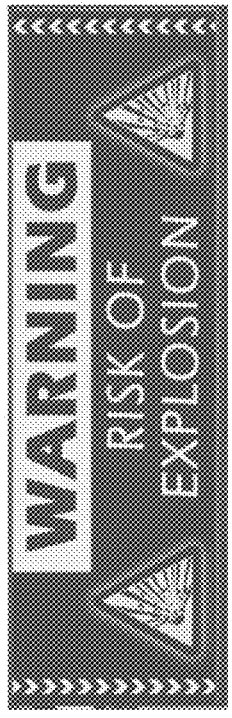
Fig. 5f
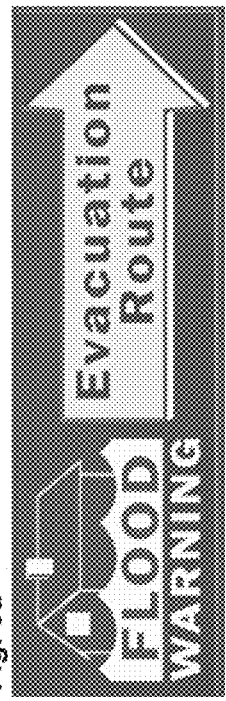
Fig. 5a
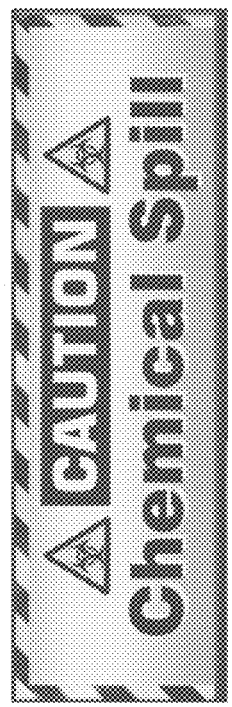
Fig. 5c
Fig. 5e

DIGITAL SIGN NETWORK

CROSS REFERENCE TO RELATED APPLICATIONS

This application is a continuation of U.S. application Ser. No. 15/583,986, filed May 1, 2017 (now U.S. Pat. No. 9,874,993), which is a continuation of U.S. application Ser. No. 14/980,773, filed Dec. 28, 2015 (now U.S. Pat. No. 9,639,233), which is a continuation of U.S. application Ser. No. 13/896,915, filed May 17, 2013 (now U.S. Pat. No. 9,221,385), which claims priority to U.S. Provisional Appl. No. 61/649,120, filed May 18, 2012; all of which are hereby incorporated by reference in their entireties.

BACKGROUND

Current and Historical Emergency Notification Systems

The emergency broadcast system ("EBS") was in existence from the early 1960s until 1997. The EBS, although intended as a national alert system, was predominantly used by state and local governments to disseminate emergency information to persons who may be affected. Generally only a nationwide activation of the EBS was required to be relayed by broadcast stations (the FCC made local emergencies and weather advisories optional). Broadcast stations generally included radio and television stations; however, many stations were classified as non-participating.

The EBS was replaced in 1997 by the emergency alert system ("EAS") which has the same primary purpose of disseminating emergency information through broadcast television and radio stations. The EAS has very limited capabilities providing only for the transmission of text and audio—no images can be transmitted. Although all broadcast stations and multichannel video programming distributors are required to maintain equipment to decode and encode the EAS signals, some are excepted out of the requirement as non-participating stations by the FCC. Even if the television or radio station is otherwise required to maintain the EAS equipment, stations are allowed to opt out of relaying severe weather or child abduction alerts (AMBER Alerts).

The EAS and EBS systems have several inherent problems. The notifications were relatively limited in information and had no capability for providing more than text and audio. This severely hampers the effectiveness of the notification.

The notifications had to be dispatched to a relatively large area such as an entire metropolitan statistical area ("MSA") which, according to the 2000 census, averages over 600 k residents each. This further limited the current emergency notification systems because the system was only employed for notifications that affected some significant portion of the MSA.

The notifications only reached those residents actively watching a traditional broadcast station in real time or listening to a local radio station. With the advent of the satellite radio and MP3 players, fewer people are listening to local radio stations. Even if people generally listened to local radio stations, there was a relatively small chance any particular person would be listening when the notification was actually delivered.

These limitations highlight the inability of current systems to effectively: target a specific area affected by an emergency; convey relevant and detailed information regarding the emergency and any suggested responses; and convey the message to individuals who are in the general vicinity of the emergency.

Billboards and Other Signage

According to the Outdoor Advertising Association of America, billboards and similar signage are the oldest mass advertising medium (having some of the first standardized posters at least as early as the $19^{th}$ century). There are an estimated 400,000 billboards in the United States. Traditional billboards have a static image and are positioned in relatively high traffic areas to increase the chances that more individuals will pass the signs and thereby view the advertisement. Early in the industries history, the signs were painted directly onto the billboard. This was later replaced by printed paper pasted on the billboard and more recently to computer-generated images on plastic substrates. The most recent evolution has been to digital billboards.

Digital billboards (officially named "changeable electronic variable message signs" or "CEVMS") mark a huge advancement in outdoor advertising and signage because they enable a changeable message/image, drastically reduce the cost of changing the message/image (in some cases even enabling the remote changing of the message/image), and permit multiple messages/images to be cycled at preset intervals (e.g. seven or eight seconds).

With the advent of digital billboards and similar dynamic signs, there has been a push to use such signs for disseminating AMBER Alerts and FBI mug shots. However, the implementation has been spotty at best and requires individual operator "buy in" and intervention. Traditionally, a particular operator will manually insert one or more FBI mug shots into the normal advertising cycle. More recently, Daktronics® (a registered trademark of Daktronics, Inc.) has provided a system by which users of its digital signs who also use its hosted sign management system can opt-in to permitting AMBER Alerts to pre-empt regularly cycling advertising; however, this is only for one brand of digital sign and it requires the operators to be using Daktronics's proprietary hosted sign management system. If the operator is using an onsite sign management system (e.g. not hosted on Daktronics's servers) or does not have Daktronics signs, the operator must manually receive and post the AMBER Alert.

A further limitation is even Daktronics's solution does not provide access to the digital signs by local or state governmental entities for other types of emergency or warning messages. Additionally, the Daktronics's solution does not provide the AMBER Alert system access to particular digital signs—only access to large groups of geographically related signs (e.g. for an MSA or an entire city, county, or even state).

In view of the above shortcomings of existing emergency notification systems, there is a need for an improved emergency notification system utilizing digital signs across disparate manufacturer's signs and that can be used by governmental entities to disseminate all types of emergency, threat, and warning information.

BRIEF SUMMARY

The disclosed subject matter provides a digital sign with a video camera. The digital sign and video camera are connected via a communications medium to a central computer. The central computer provides a way of changing the images displayed on the digital sign and of disseminating the video from the video camera either through real time forwarding/viewing or recording the real time video stream and playing back the recorded video to a user. The central computer also provides a user interface where a user, which would normally include a governmental entity, can view the video stream and upload emergency notification messages that would then be sent to be displayed on the digital sign without regard to the particular digital sign's manufacturer.

An object of the disclosed subject matter to provide an enhanced way for emergency messaging to reach the public.

Still another object of the disclosed subject matter is to provide the ability to provide alternative routing information, location and/or availability of supplies (e.g. water, food, wood, fuel, etc.), and the location and/or availability of lodging.

Another object of the disclosed subject matter to provide authorized governmental entities, as well as other authorized users, the ability to unilaterally change the image and/or message being displayed on the digital sign.

Yet another object of the disclosed subject matter to provide authorized users access to the video stream to monitor the location in proximity to the digital sign.

Another object of the disclosed subject matter is to provide a user interface that displays which digital signs and video cameras a particular user has access to.

Still another object of the disclosed subject matter is to provide authorized users the ability to select one or more digital signs to "upload" an emergency message to.

Another object of the disclosed subject matter is to provide an emergency classification system which dictates how long and how often a particular emergency message appears on the digital sign.

An additional object of the disclosed subject matter is to allow the emergency message to take the place of one advertisement or to be cycled along with other advertisements.

Yet another object of the disclosed subject matter is to permit advertisers to sponsor the emergency message.

Another object of the disclosed subject matter is to provide users a graphically based map displaying the particular digital signs and cameras for which the user has access.

Still another object of the disclosed subject matter it to provide users "point-and-click" access to one or more digital signs and easily dispatch the emergency message to the selected digital signs.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims filed later.

BRIEF DESCRIPTIONS OF THE DRAWINGS

The features believed characteristic of the disclosed subject matter will be set forth in any claims filed later. The disclosed subject matter itself, however, as well as a preferred mode of use, further objectives, and advantages thereof, will best be understood by reference to the following detailed description of illustrative embodiments when read in conjunction with the accompanying drawings, wherein:

FIG. 1 depicts a graphical overview of one general system architecture that could be employed to implement the disclosed subject matter.

FIGS. 2a, 2b, 2c, and 2d depict various flow charts of the process and information flow of an embodiment of the disclosed subject matter.

FIGS. 4a and 4b depict exemplary graphical maps that could be transmitted to the user to show the approximate location of cameras and/or digital signs in relation to structures, landmarks, roads, or the like.

FIGS. 5a through 5k depict exemplary emergency messages.

In the figures, like elements should be understood to represent like elements, even though reference labels are omitted on some instances of a repeated element, for simplicity.

DETAILED DESCRIPTION OF ILLUSTRATIVE EMBODIMENTS

Figure 2A:
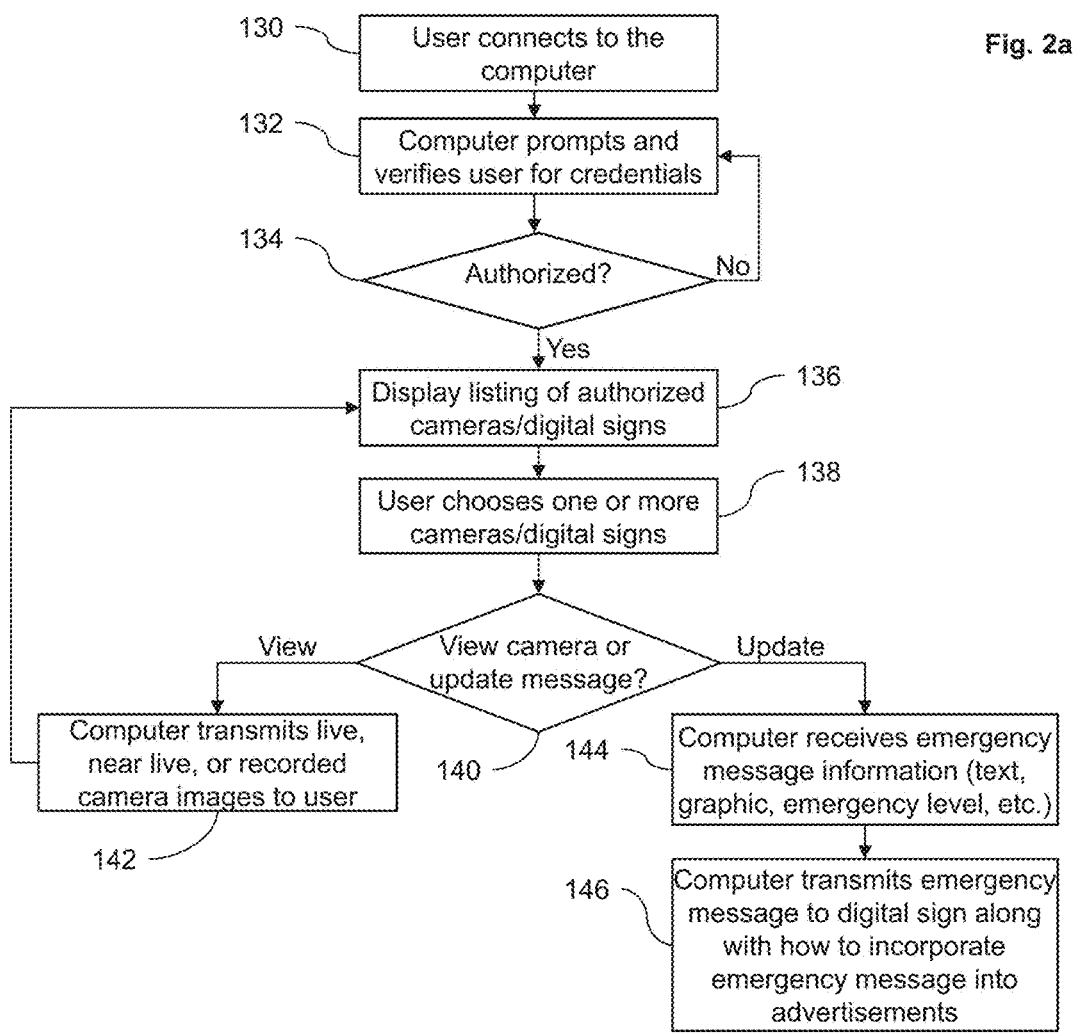

Although described in many embodiments as a digital billboard, these are merely examples and are not intended to limit the disclosure in any way. Additionally, although described with reference to a digital sign, those with skill in the arts will recognize that the disclosed embodiments have relevance to a wide variety of areas in addition to those specific examples described below.

All references, including publications, patent applications, and patents, cited herein are hereby incorporated by reference to the same extent as if each reference were individually and specifically indicated to be incorporated by reference and were set forth in its entirety herein.

Certain terms are used throughout this disclosure. Generally the following terms have the following meanings unless the context clearly necessitates an alternative meaning. A digital sign includes any device that can display an image and dynamically display a different image in response to a signal (e.g. digital billboard, television screen, computer monitor, cell-phone/smart-phone screen, tablet screen, etc.). Real time video, live video, near live video, and video feed includes both real time video and near real time video. Video is intended to include both video and still pictures. Governmental entity means a government or quasi-governmental organization, corporation, business, agency, or body; law enforcement, emergency medical services, fire department, or other first responders and emergency personnel; public and quasi-public utility providers and servicers; and the like. Video camera or camera means a device capable of capturing or delivering a moving image or a series of still images at relative time relative time intervals (e.g. network or IP camera, dome camera, bullet camera, camcorder, etc.). Video camera is intended to include all video cameras regardless of image sensor (e.g. CCD (charge-coupled device), CMOS (complementary metal-oxide-semiconductor), megapixel, etc.), type (e.g. color, black and white, infrared, thermal, etc.), and/or compression standard (e.g. motion JPEG, MPEG-4, H.264, etc.). Unilaterally means without additional intervention by a third party. Communication medium means any medium by which two or more computers or electronic systems may transfer information (e.g. wi-fi, wi-max (world interoperability for microwave access), wi-bro (wireless broadband), satellite, DSL (digital subscriber line), cable modem, Ethernet, coax, fiber-optic, Internet, LAN (local area network), WAN (wide area network), PAN (personal area network), cellular, super wi-fi, 3g and its progeny, 4g and its progeny, LTE (long term evolution), and any future communications standards, etc.).

FIG. 1 depicts a graphical overview of one general system architecture that could be employed to implement the disclosed subject matter. Users (100, 102, 104, 106) (collectively, 122) would connect to a computer 110 via a communication medium 108. The computer would be connected to the digital signs (114, 116, 118, 120) (collectively, 124) via a communication medium 112. Although depicted here as two different communication mediums (108, 112) one or more could actually be employed. Also, although depicted here as four users (100, 102, 104, 106) and four digital signs (114, 116, 118, 120), any number is within the disclosed subject matter. Finally, although a single computer 110 is shown, one or more computers and/or servers could be employed. The digital signs 124 could also contain one or more video cameras 126 (not shown) intended to transmit video of the area surrounding a digital sign 124 and not necessarily video of the digital sign 124 itself. In some embodiments, a camera 126 directed at the digital sign 124 may be used for "proof of performance" (e.g., to demonstrate that an advertisement that should be displayed is actually being displayed). Such a camera 126 may in some embodiments provide low-frame-rate updates, because the content of digital sign 124 is typically expected to change only slowly. For example, a proof-of-performance camera might update at one frame per second, one frame per ten seconds, one frame per minute, one frame per ten minutes, or some other suitable frame rate. In some embodiments, a pair of cameras 126 may be used to show traffic conditions in each direction along the roadway from a digital sign 124. The digital signs 124 have circuitry to receive communication from the computer 110 in order to change the image, mode, and/or operation of the digital sign 124.

The users 122 could connect to the computer 110 through a myriad of devices including computers, smart phones, tablets, notebooks, laptops, personal digital assistants, or other computing style devices capable of connecting with the computer 110 via a communication medium.

Referring now to FIGS. 2a, 2b, 2c, and 2d which depict various flow charts of the process and information flow of an embodiment of the disclosed subject matter. Referring first to FIG. 2a which shows a possible information and process flow when a user 122 requests a video feed and or wishes to transmit an emergency message. First the user 122 connects to the computer 130 and enters its credentials 132. The computer 110 verifies the credentials 134 and if incorrect could prompt the user to re-enter its credentials 134. If the credentials are accepted, the computer 110 would transmit a listing of cameras and/or digital signs for which the user 122 is associated 136. In an alternative embodiment, a graphical map could be transmitted to the user to show the approximate location of cameras and/or digital signs in relation to structures, landmarks, roads, or the like and could allow the user 122 to zoom into a particular area (see FIGS. 4a and 4b). In yet another alternative embodiment, the user could search for a particular camera and/or digital sign using zipcode, location, unique identifier number, etc.

The user could then select one or more cameras or one or more digital signs 138. If the user 122 selected to view one or more cameras 140 the computer 110 would transmit live, near live, or recorded images to the user 122. In one embodiment, the user could view multiple cameras at the same time (e.g. in a 2-up, 4-up, 8-up, n-up orientation) or in a rotation where each camera feed is displayed for a pre-set or user 122 configurable time period. Additionally, in one embodiment more specifically discussed in relation to FIG. 2b, the user 122 could pan, tilt, or zoom the camera or even place the camera into a "patrol" mode where the camera scans the viewable area repeatedly.

Continuing with FIG. 2a, if the user 122 chose to update the digital sign with an emergency message 140, the computer 110 would receive the emergency message information 144. The emergency message information should contain at least the emergency message to be delivered to the one or more digital signs, but could also include an emergency level, time period (e.g. display for the next hour), date and time of activation, date and time of deactivation, etc. The emergency message itself could contain one or more text messages and/or images. An emergency level could also be employed whereby the user 122 indicates the severity of the emergency. This in turn could trigger pre-set guidelines on: how often to display the emergency message in the normal advertising rotation or whether to completely pre-empt the normal advertising rotation; how long to display the message; etc. For example, the user 122 could choose between routine, urgent, critical. Routine could be pre-defined as temporary incidents or "be on the lookout" style of messages such as traffic and construction matters or missing elderly. Urgent could be pre-defined as incidents that could put people, property, and/or animals in harm's way such as escaped convicts. Critical could be pre-defined as there is imminent risk to people, property, and/or animals such as hurricanes, tornados, chemical spills, evacuations, etc. Additionally, each of the emergency levels could have pre-defined display characteristics, such as:

Routine: display message after each advertisement, but do not preempt any advertising (e.g. A1, Emergency Message, Ad2Emergency Message, . . . , Ad7, Emergency Message, Ad1 . . . ) for 30 minutes.

Urgent: display the message after each advertisement and reduce the display time of the advertisements (e.g. Ad1-4 seconds, Emergency Message-8 seconds, Ad2-4 seconds, Emergency Message-8 seconds, . . . ) for three hours.

Critical: display only the emergency message until affirmatively cancelled by the user.

The preceding emergency levels are intended only as examples and any other names, classifications, time limits, preemption, and number of the foregoing could be employed and remain within the scope of this disclosure. In addition, to static images and messaging, streaming video and/or messages or moving video and/or messages could also be employed throughout this disclosure.

In one embodiment, the emergency message would be cycled/displayed until the initiating user 122 requested the message to cease. In another embodiment, the emergency message would be cycled/displayed for a pre-set time period (e.g. one hour; according to the emergency level) and if the user 122 desired the message to continue, the user 122 would have to affirmatively extend the time period (e.g. issue the same emergency message again; re-enter the time period; etc.).

Because multiple users could have access to a particular digital sign at any one time, it is possible to have two competing emergency messages. This could be addressed in several different ways. One example could be to allow only the message with the higher emergency level to be displayed, in effect preempting the "lower" level emergency message. In another example, both emergency messages could be cycled according to some pre-defined criteria similar to those of the emergency levels. In yet another example, the emergency messages could be ranked by user 122 (e.g. local emergency preempts state emergency).

The emergency message information could be transmitted from the user to the computer 110 in a specific format containing the required information. In an alternative embodiment, the computer 110 could provide a "wizard" style interface guiding the user 122 through the required information (e.g. drop down boxes, fill in boxes, radial buttons, text boxes, image upload). In one embodiment, the computer 110 could provide templates such as those depicted in FIGS. 5a through 5k to assist the user 122 in creating the emergency message. Also, the computer 110 could provide the user access to previously issued emergency messages that were initiated by the user 122 (or in an alternative embodiment, that were issued by other users 122) to assist the user 122 in constructing an effective and clear emergency message.

Nevertheless, once the computer 110 receives the required emergency message information, the computer 110 would transmit the emergency information along with instructions on how the emergency message should be integrated into the pre-existing advertising rotation to the digital sign 146. In one embodiment the computer 110 would also log pertinent information about the emergency message which could include: the user's 122 name/login credentials, the time of the emergency message information transmission, which digital signs where included in the emergency message, confirmation the emergency message was successfully transmitted to the digital signs, confirmation the emergency messages was removed from the digital sign, etc.

Because there is always the potential for abuse with a system that permits a user to unilaterally display a message to the public, computer 110 could be configured to require confirmation of the proposed emergency message from another user 122 associated with the entity (e.g. supervisory approval). Although possible, it is important to note that this additional confirmation is not intended to be the owner or operator of the digital signs 124 but another person associated with the entity.

The computer 110 and camera 126 are connected via a communication medium. In one embodiment, the camera 126, or a local computer in relatively close proximity to the camera 126, could store the video feed and/or images from the camera 126 until sent or retrieved by the local computer 110. In an alternative and/or complimentary embodiment, the computer 110 could retrieve the video feed and/or images from the camera 126 itself (e.g. from the camera's 126 memory or via live feed) or the local computer in response to a user 122 request. In an alternative embodiment, the camera 126 or the local computer could transmit continuously to the computer 110. Referring now to the specific embodiment shown in FIG. 2b which depicts a flow diagram of the process and information transfer between the computer 110 and camera 126. The computer 110 is connected to the camera 150. If the computer 110 has updated instructions for the camera 152, the computer 110 transmits the new instructions to the camera 154. These instructions could include: changing the frame rate (e.g. 30 frames per second ("fps"), 15 fps, 1 fps, 0.1 ps, etc.); changing the resolution (1024×768, 640×480, 550 lines of resolution ("lor"), 400 lor, 1080 p, 1080i, 480i, etc.); changing the color, contrast, skew, or other aspects of the image; changing the focus, pan, tilt, or zoom; etc.

If there were not new instructions, or the new instruction were previously transmitted, the computer receives or retrieves the camera 126 image 156 and stores the image 158 for archival and delivery to a requesting user 122. The addition of cameras 126 to the digital signs 124 adds an additional information gathering tool for users 122. For example, users 122 can evaluate the scene of an emergency before emergency responders arrive and convey pertinent information. Users 122 could monitor the progression or clean-up of an emergency and update the digital signs 124 accordingly. Users 122 could also review accidents and use the recorded footage for both crime prevention and crime solving. Additionally, real-time traffic flows, congestion, and other traffic statistics can be compiled, analyzed, and disseminated.

In addition to transmitting live, near live, or recorded video and/or images, the camera 126 in conjunction with software could perform other services such as performing traffic counts.

Referring now to FIG. 2c which depicts the direct transmission of emergency message information from the computer 110 to the digital sign 124. First, the computer 110 connects to one of the digital signs 170. The computer 110 transmits the emergency message information to the digital sign 172 and waits for confirmation that the digital sign 124 received the emergency message 174. If the digital sign 124 did not properly acknowledge the emergency message information, the computer 110 will retransmit the emergency message information. However, if the digital sign 124 acknowledges the emergency message information, the computer 110 disconnects 178 and provides confirmation to the user 122 that the emergency message information was properly delivered 180.

Figure 2D:
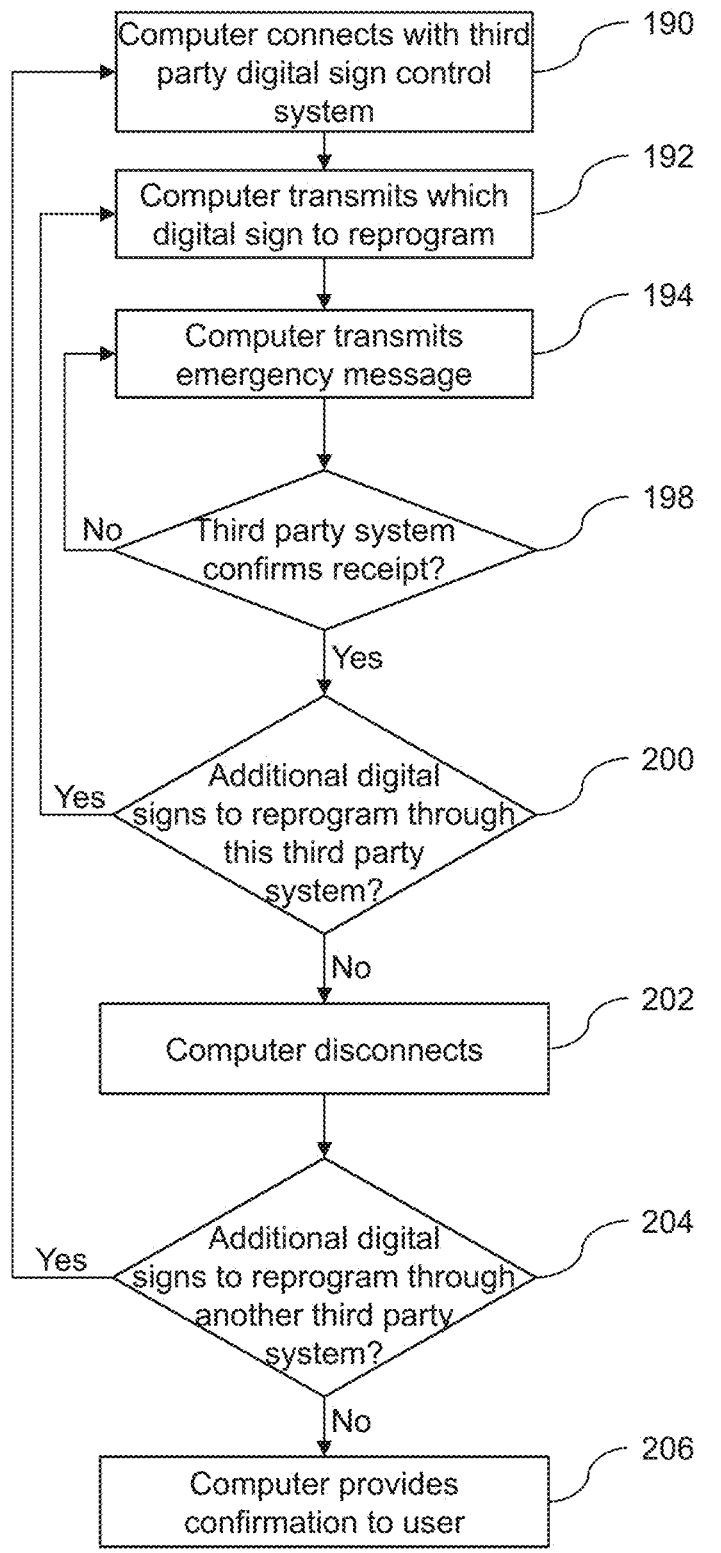

Referring now to FIG. 2d which depicts using a third party digital control system to transmit the emergency message information from the computer 110 to the digital sign 124. First, the computer 110 connects to the third party digital sign control system (e.g. a proprietary online or local software program used to connect with and/or reprogram a particular manufacturer's digital sign 124). This connection step 190 could include providing credentials to the third party digital sign control system or otherwise "logging into" the third party digital sign control system. The computer 110 then transmits which digital sign is intended to be reprogramed 192. The computer 110 then transmits the emergency message information in a format designed to be compatible with the third party digital sign control system 194. It is important to ensure that the format of the transmission is customized for the particular third party digital sign control system because each manufacturer's system is different.

The computer 110 waits for confirmation of receipt 198 and retransmits if receipt is not acknowledged. The computer then determines if there are additional digital signs 124 that require reprogram and that are associated with this particular third party digital sign control system 200. If there are, computer 110 repeats starting with 192. If there are no more digital signs 124 requiring reprogram from this particular third party digital sign control system, the computer 110 disconnects 202. If there are additional digital signs 124 requiring reprogram from alternate third party digital sign control systems 204 the computer 110 repeats from 190 for each additional third party digital sign control system. Once completed, the computer 110 provides confirmation to the user 122 that the emergency message information was properly delivered 206.

Some third party digital sign control systems may vary in the order of the above steps, may omit one or more of the above steps, and/or may need additional steps. The preceding is merely an example of one possible way of delivering the emergency message information to the digital sign 124 via a third party digital sign control system.

It is important to note that the disclosed subject matter can place users 122 in control of the emergency messaging capability of the digital signs 124 without additional owner/operator involvement. In effect, the user 122 has unilateral control over creating the emergency message, selecting the affected area, and delivering the emergency message without additional human interaction or owner/operator approval or consent. For example, traditional systems require a person to prepare the emergency message, identify the owner/operator of each digital sign 124, contact the owner/operator of each digital sign 124, and transmit the emergency message to the owner/operator. Then, the owner/operator has the option to post the emergency message and if chooses to post the emergency message, must upload the emergency message to the digital sign 124 (which may include dispatching personnel to each digital sign 124). If the person desires to change the emergency message, the process must be restarted. Finally, at some point in the future, the person initiating the notification must contact the owner/operator to remove the emergency message and the owner/operator must actually take action to remove the emergency message.

Figure 3:
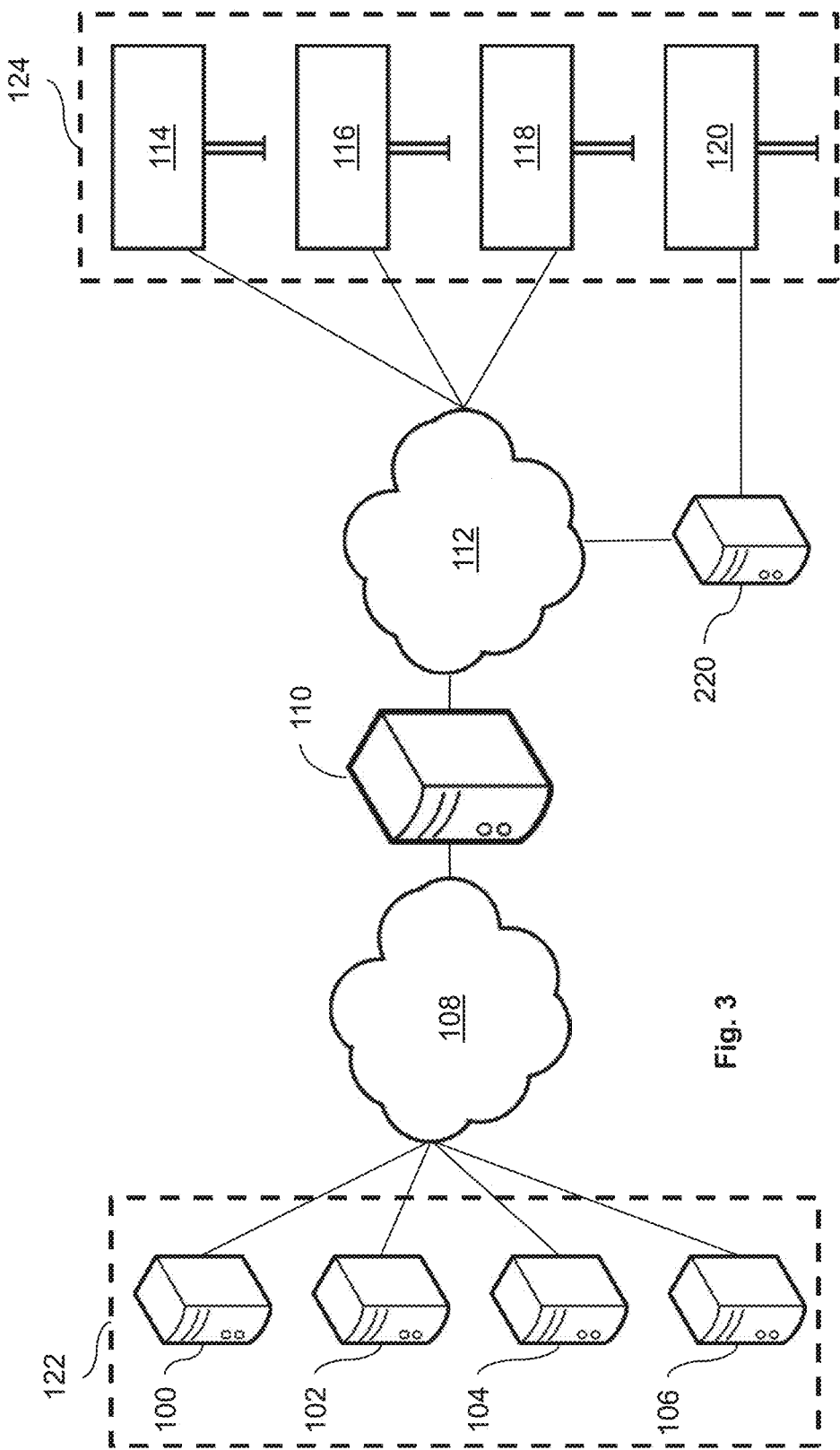
FIG. 3 depicts a graphical overview of a general system architecture that could be employed to implement the disclosed subject matter with the addition of third party digital sign control systems.
Figure 5G:
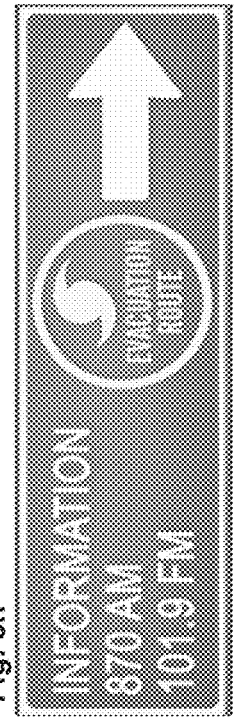
Figure 5I:
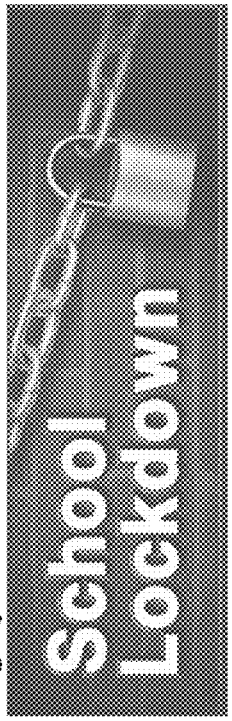
Figure 5H:
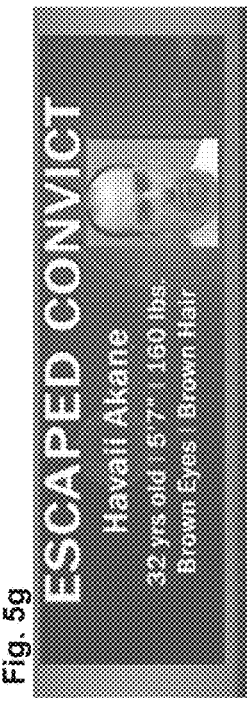
Figure 5J:
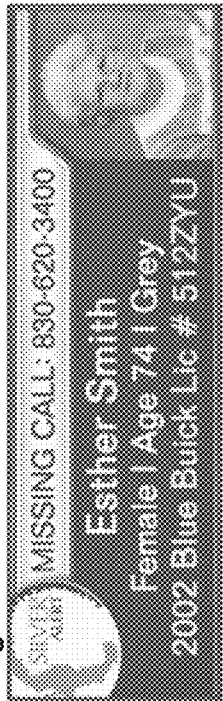
Figure 5K:
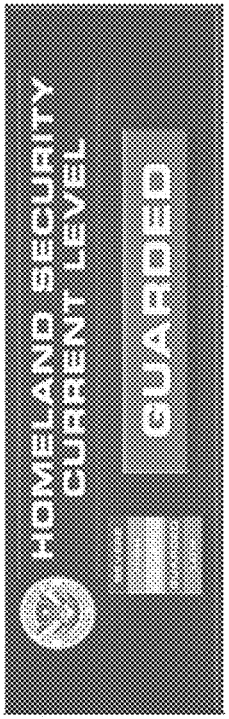

FIG. 3 depicts a graphical overview of a general system architecture that could be employed to implement the disclosed subject matter with the addition of third party digital sign control systems. This Figure parallels FIG. 1, but depicts the addition of third party digital sign control systems 220 where direct control of the digital signs 124 is not permitted or practicable. Although depicted here as a single third party digital sign control system 220 connected to a single digital sign 120, any number of third party digital sign control systems 220 could be included which any one of those third party digital sign control systems 220 could be connected to more than one digital sign 124.

Turning now to FIGS. 4a and 4b which depict exemplary graphical maps that could be transmitted to the user 122 to show the approximate location of cameras and/or digital signs in relation to structures, landmarks, roads, or the like. More specifically, FIG. 4a depicts a graphic of the State of Texas with geographically related cameras 126/digital signs 124 grouped in boxes. These boxes are one way to allow a user 122 to drill down and select one or more cameras 126 or digital signs 124. Referring now to FIG. 4b depicting an exemplary graphic of downtown Austin, Texas showing individual cameras 126 and digital signs 124. Although shown as static images, the system could allow users 122 to arbitrarily reposition the map and/or zoom into locations.

The system could also allow each user 122 to create its own boxes or groupings of cameras 126 and/or digital signs 124. Additionally, the system could allow the user 122 to draw a box on the map to select all cameras 126 or digital signs 124 within the box. The system could also permit the user 122 to click on particular roads/streets/highways/etc. to bound a particular area and thereby select all cameras 126 or digital signs 124 adjacent to and/or within the particular area. Yet another embodiment could allow the user 122 to pick a particular point on the map and select all cameras 126 or digital signs 124 within a certain radius of the point. Additionally or alternatively to the foregoing, zip codes, area codes, GPS, or other coordinate/location systems (e.g. latitude and longitude) could be employed. Clearly, other methods of selection could also be employed (e.g. pick a point and predict fall out based on current or traditional wind patterns; auto-select based on storm track; etc.). The result of the foregoing to allow the user 122 the ability to confine the emergency notification to a particular geographic area.

FIGS. 5a through 5k depict exemplary emergency messages. It should be noted that the exemplary emergency messages could be in color although depicted here as greyscale.

Because of the nature of the disclosed subject matter for disseminating emergency messages, it is important to have continual power and communications. As such, one should consider having redundancy and back-up power. For example, redundancy could include having multiple computers 110 and multiple computers 110 in geographically remote areas relative to each other. Uninterruptable power supplies or other redundant power technologies could be employed both at the computers' 110 location and the digital sign's 124 location. Finally, one could employ redundant communication mediums to and from each geographic location (e.g. computers 110, digital signs 124, third party digital sign control systems, etc.).

In an alternative or complimentary embodiment, the disclosed subject matter could be coupled to a resource notification system via one or more communications mediums. The resource notification system is generally a database that is populated and updated to show the location of certain resources throughout an area. As an example, a database may store the location of stores with food, water, wood, fuel, or other supplies and/or the location of available lodging. (The term "travel facilities" is used herein to refer to providers of food, water, wood, fuel, and lodging. Information regarding travel facilities, such as the location and/or current availability thereof, is referred to as "travel data" herein.) As was painfully evident during the evacuation of the Texas Gulf Coast in September 2005 ahead of hurricane Rita, such information can literally make the difference between life and death.

As an example of an embodiment that makes use of travel data, a governmental body and/or an owner/operator of digital signs 124 may establish a database for travel data. In various embodiments, such a database may include information such as the location or current supply state of travel services, emergency medical services, etc. For example, the current supply state of travel services might include such information as the number of rooms available at a hotel; whether a gas station has gasoline and/or diesel available; whether a gas station has various grades of gasoline available; how much of each type of fuel a gas station has available; whether a grocery store has food and/or water available; how much food and/or water a grocery store has available; whether a grocery store is open for business; whether a restaurant has food and/or water available; how much food and/or water a restaurant has available; whether a restaurant is open for business; and other information describing the availability and/or supply of various travel services.

Information may be updated periodically by travel facilities themselves, e.g., by entering such information via a website. In some embodiments, travel facilities may provide information automatically to the travel information database in real-time or substantially real-time, for example by allowing interoperability with their own database systems. For example, such information may be received at the travel information database via a wide-area network.

In some embodiments, telephone calls or other methods may be used to update the travel information (although typically such methods may not provide real-time information). For example, the operator of the travel information database may call or email travel facilities at specified times to request that they update their information in the travel database.

A given digital sign 124 may be associated with a particular geographic region and configured to display information for that region. In other words, information from the travel database may be geographically linked to the relevant region(s) and provided to the appropriate digital signs 124. For example, the relevant geographic region for various types of travel facilities might encompass signs within a given distance of the facility (e.g., as the crow flies); signs within a given distance of the facility along roads; signs on the same road as the facility and within a given distance; signs within the same city, county, or state as the facility; all signs within an emergency zone; etc. The relevant distance for such geographical boundaries might be any suitable distance, such as 0.5 miles, 1 mile, 2 miles, 5 miles, 10 miles, 20 miles, 50 miles, etc.

Accordingly, travelers may be provided with accurate and up-to-date information about the availability of services they need in a geographically accessible area. Alternatively or additionally, the system may be configured to display on a particular sign information regarding all travel data within a relevant area or geographical region of that sign. Accordingly, each sign may display different information corresponding to the travel data relevant to the particular geographical area relevant to that sign.

Such information may be displayed alongside advertising information, or it may in an emergency situation displace the advertising information.

Figure 6:
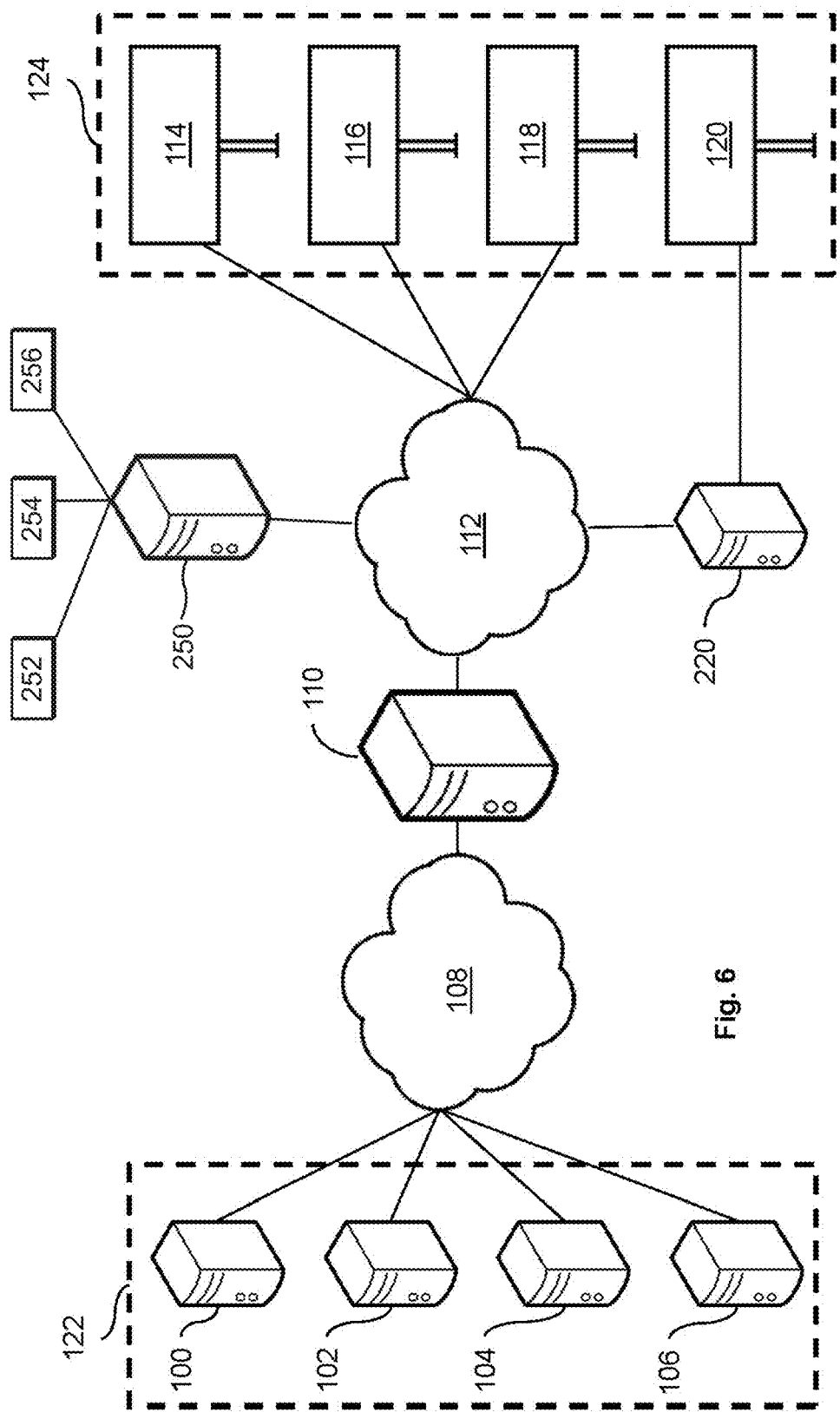
FIG. 6 depicts a graphical overview of a general system architecture that could be employed to implement the disclosed subject matter with the addition of a travel database.

FIG. 6 depicts a high-level overview of one embodiment of this disclosure. The system of FIG. 6 is broadly similar to what is shown in FIG. 3, but with the addition of travel database 250. Travel database 250 may be connected to computer 110 via, e.g., communication medium 112. One of ordinary skill in the art will recognize that travel database 250 need not be implemented in a separate physical machine/machines, but may in some embodiments reside within computer 110.

Travel database 250 may receive travel data updates from travel facilities 252, 254, and 256 through various means, some examples of which have been mentioned above. Computer 110 may then cause such travel data to be displayed upon the relevant ones of digital signs 124.

For example, in an emergency, travelers may need gas. Accordingly, computer 110 may cause one or more of digital signs 124 to display information about which gas stations nearby have gas available for sale. Similar information regarding other travel data may also be displayed as appropriate and as desired.

Although described and shown in many examples as billboards outside along roadways, the disclosure should not be read in a limiting sense and indoor, outdoor, on-premises, off-premises, or other digital signs are intended to be included within the scope of the disclosure. Advertising and/or way-finding kiosks (e.g. in a mall or other relatively populated indoor or outdoor area) are intended to be included in the foregoing. Additionally, as automobiles become more and more connected, the notifications could also be delivered to on-board computers and displays within the automobile. In such an embodiment, it would be helpful to have the ability to geolocate a particular automobile to help ensure the notification being delivered was appropriate for the automobiles current geographic location. Similarly, for other "mobile" or "non-location-fixed" digital signs (e.g. cell phones, smart phones, tablets, etc.), an application or other software program could be employed to retrieve or receive notifications pertinent to the sign's current geographic location through geolocation services/equipment on the sign.

As was described above, well-placed digital signs 124 have the ability to convey very detailed and pertinent emergency information directly to the particular location effected by the emergency situation. The old adage "a picture is a worth a thousand words" proves especially true in an emergency situation and digital signs 124 provide a way for users 122 to quickly and efficiently provide text and graphics directly to affected parties.

Figure 7:
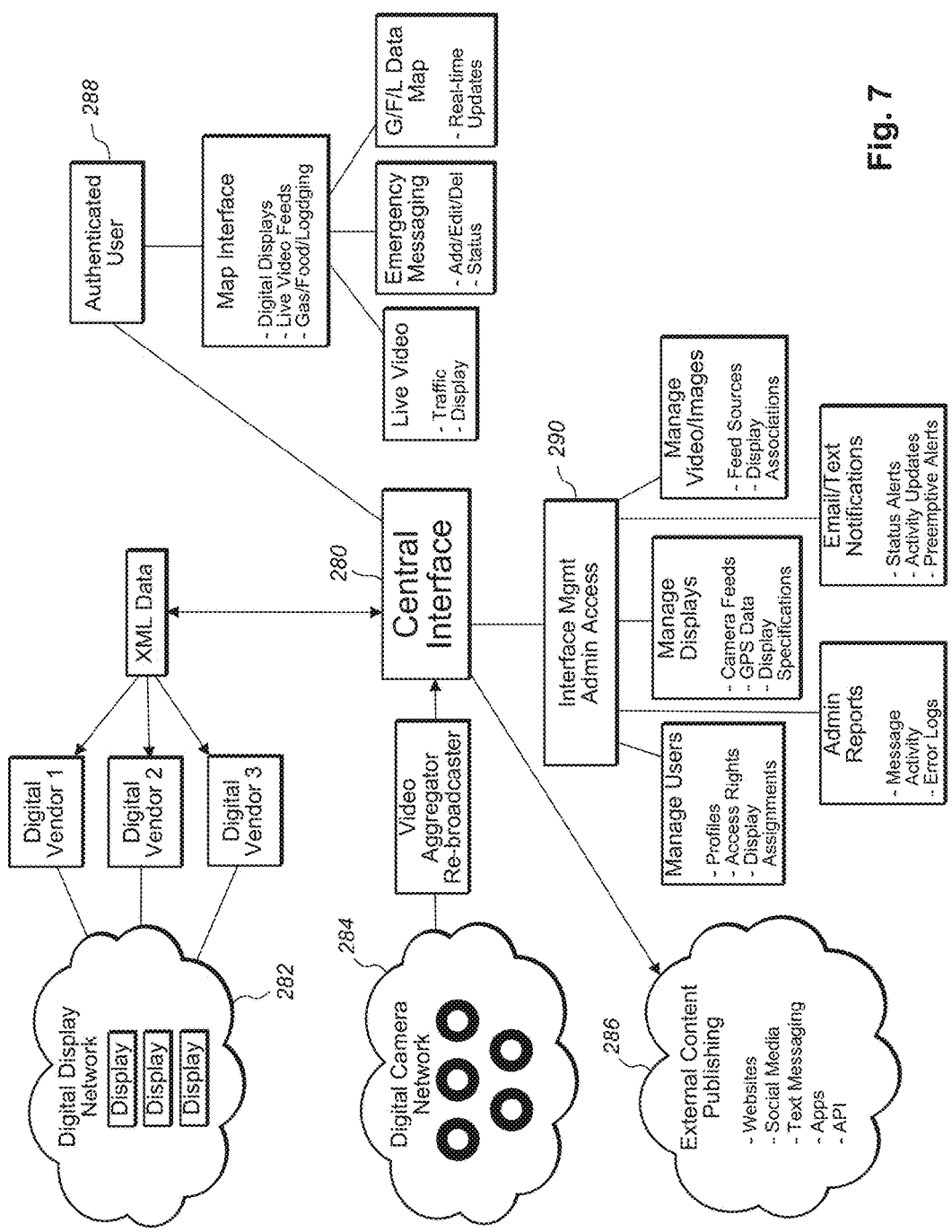
FIG. 7 depicts various aspects of interface components according to an embodiment of this disclosure.

FIG. 7 shows an interface diagram according to an embodiment of this disclosure. As shown in FIG. 7, central interface 280 may be provided to allow access to various aspects of this disclosure. Some of these aspects may be broadly grouped as digital display network 282, digital camera network 284, external content publishing 286, authenticated user interface 288, and interface management administrator access interface 290. According to some embodiments, central interface 280 may be a web-based interface.

According to some embodiments, central interface 280 enables publishing of emergency and non-emergency messaging, including text and graphics, which may be published to the digital display network 282 and/or any number of 3rd party destinations, such as external content publishing 286 (see below for more information regarding an interface API for external publishing). Digital display network 282 may in some embodiments be accessed via an XML interface to various 3rd-party digital sign interfaces (e.g., Visiconn and other vendors). Messages may be created from pre-defined templates in a template library or by using custom graphics and text uploaded by the user. In various embodiments, some types of messaging may include:

Weather Alerts
Homeland Security and Terrorist Alerts
Blue Alerts
Silver Alerts
Amber Alerts
Evacuation Information
Hazardous Conditions
Environmental Hazards
Community-service Messages As shown in FIG. 7, digital display network 282 may be capable of receiving real-time emergency messaging from central interface 280. Any display connected to a publishing system capable of receiving content from the interface may be included in the network, in various embodiments.

A network of digital cameras capable of sending live video feeds to the video aggregation software is also shown in FIG. 7 as digital camera network 284. Video feeds may become available through the interface across a variety of devices, including desktop computers, smartphones, tablets, etc.

According to some embodiments, a map-centric user interface may be provided, e.g., via authenticated user interface 288. In this embodiment, the map-based interface is the primary user interface for interacting with digital displays, video feeds, and data. This interface may consist of custom icons, windows, and data overlaid on an interactive map (e.g., a map provided via Google)Maps®. This may include the ability to upload custom or predefined messaging graphics and text to content recipients, including digital displays, social networks, 3rd party websites, email and text message recipients.

According to some embodiments, gas/food/lodging (GFL) data may be provided via a proprietary database of services. This may be used in emergency situations to assist local and state emergency management entities in identifying resources. This data may be provided through the map interface and include detailed, real-time information about the status of each resource, such as fuel or food availability, along with the location and contact information of each product/service provider.

Real-time travel and weather information, such as road conditions, traffic flow, travel times, accidents, severe weather warnings and updates may further be provided. All real-time information may be available through the map interface as well as through the publishing system, which may be disseminated to the display network and/or any 3rd parties that request access to this information.

An interface API for external publishing via external content publishing 286 may also be provided. This may be implemented as an external interface to the publishing system, which may allow for content requests/subscriptions from 3rd parties, such as other websites. 3rd party entities that subscribe to content updates from the publishing system may receive relevant emergency messaging and graphics in real-time.

This external interface may also provide for "pushing" content to 3rd parties, such as social networks (Facebook®, Twitter®, etc.) Content updates may be sent to each 3rd party according to the specifications required by each receiving system. For example, the Twitter® API may be used to send content to Twitter ® accounts that have subscribed for updates. 3rd parties may include social networks, email accounts, wireless carries (for text/media messaging), instant messaging networks and other real-time messaging systems or information systems that may be in use by state and local emergency management agencies.

Further, interface management administrator access interface 290 may be provided via central interface 280. This may in various embodiments allow user management, display management, video/image management, administrative reports, and/or email/text notifications.

Although example diagrams to implement the elements of the disclosed subject matter have been provided, one skilled in the art, using this disclosure, could develop additional hardware, software, methods, and/or apparatuses to practice the disclosed subject matter and each is intended to be included herein.

Additionally, in many instances multiple embodiments are provided; however, no single embodiment must include all aspects and different embodiments or aspects of embodiments may be combined to create alternative/complimentary embodiments. Furthermore, the use of the word alternative in combination with embodiment is not intended to be exclusive and could also be a complimentary embodiment.

In addition to the above described embodiments, those skilled in the art will appreciate that this disclosure has application in a variety of arts and situations and this disclosure is intended to include the same.

What is claimed is:

1. A computing system, comprising:
at least one processor;
a memory; and
a network interface configured to communicate with a plurality of digital signs via a wide-area network;

wherein the computing system is configured to:
cause travel data to be displayed on the plurality of digital signs, wherein the travel data is indicative of a current supply state of at least one of the following types of travel resources: food, fuel, and lodging;
receive input indicative of user credentials from a user, wherein the user is associated with a governmental entity;
based on the user credentials, determine a subset of digital signs, from the plurality of digital signs, that the user is authorized to access;
provide, to the user, an interface that is operable to control the subset of digital signs, wherein the subset of digital signs are presented via the interface, and wherein a second subset of digital signs that the user is not authorized to access are not presented via the interface;
receive, from the user, a selection of one or more digital signs, of the subset of digital signs, on which to display content corresponding to an emergency event;
receive, from the user, information indicative of the emergency event, including an emergency message and an emergency level of the emergency event; and
based on the emergency level, interrupt the travel data being displayed on the one or more digital signs to cause the content corresponding to the emergency event to be displayed on the one or more digital signs.

2. The computing system of claim 1, wherein the interface depicts a graphical map that includes icons for the subset of digital signs, wherein the icons are depicted at locations on the graphical map corresponding to respective physical locations of the subset of digital signs.

3. The computing system of claim 1, wherein the interface provides a listing of the subset of digital signs that the user is authorized to access.

4. The computing system of claim 1, wherein causing the content corresponding to the emergency event to be displayed includes connecting to the one or more digital signs via a third-party digital sign control system.

5. The computing system of claim 1, wherein causing the content corresponding to the emergency event to be displayed includes causing the one or more digital signs to alternatingly display the travel data and the content corresponding to the emergency event based on a particular time interval.

6. The computing system of claim 1, wherein causing the content corresponding to the emergency event to be displayed includes completely preempting the travel data to cause the content corresponding to the emergency event to be displayed without interruption by the one or more digital signs.

7. A method, comprising:
causing, by a computer system via a wide-area network, travel data to be displayed on a plurality of digital signs, wherein the travel data is indicative of a current supply state of at least one of the following types of travel resources: food, fuel, and lodging;
receiving, by the computer system, input indicative of user credentials from a user, wherein the user is associated with a governmental entity;
based on the user credentials, determining, by the computer system, a subset of digital signs, from the plurality of digital signs, that the user is authorized to access;

providing, by the computer system to the user, an interface that is operable to control the subset of digital signs, wherein the subset of digital signs are presented via the interface, and wherein a second subset of digital signs that the user is not authorized to access are not presented via the interface;

receiving, by the computer system from the user, a selection of one or more digital signs, of the subset of digital signs, on which to display content corresponding to an emergency event;

receiving, by the computer system from the user, information indicative of the emergency event, including an emergency message and an emergency level of the emergency event; and based on the emergency level, the computer system interrupting the travel data being displayed on the one or more digital signs to cause the content corresponding to the emergency event to be displayed on the one or more digital signs.

8. The method of claim 7, wherein the interface depicts a graphical map that includes icons for the subset of digital signs, wherein the icons are depicted at locations on the graphical map corresponding to respective physical locations of the subset of digital signs.

9. The method of claim 7, wherein the interface provides a listing of the subset of digital signs that the user is authorized to access.

10. The method of claim 7, wherein causing the content corresponding to the emergency event to be displayed includes connecting to the one or more digital signs via a third-party digital sign control system.

11. The method of claim 7, wherein causing the content corresponding to the emergency event to be displayed includes causing the one or more digital signs to alternatingly display the travel data and the content corresponding to the emergency event based on a particular time interval.

12. The method of claim 7, wherein causing the content corresponding to the emergency event to be displayed includes completely preempting the travel data to cause the content corresponding to the emergency event to be displayed without interruption by the one or more digital signs.

13. The method of claim 7, wherein the computer system is further configured to receive, via a network interface, travel data indicating availability of at least one resource in a geographic region in which at least one of the plurality of digital signs in located.

14. A system, comprising:
a plurality of digital signs;
a computer system, comprising:
at least one processor;
a memory; and
a network interface configured to communicate with the plurality of digital signs via a wide-area network;
wherein the computer system is configured to:
cause travel data to be displayed on the plurality of digital signs, wherein the travel data is indicative of a current supply state of at least one of the following types of travel resources: food, fuel, and lodging;
receive input indicative of user credentials from a user, wherein the user is associated with a governmental entity;
based on the user credentials, determine a subset of digital signs, from the plurality of digital signs, that the user is authorized to access;
provide, to the user, an interface that is operable to control the subset of digital signs, wherein the subset of digital signs are presented via the interface, and wherein a second subset of digital signs that the user is not authorized to access are not presented via the interface;
receive, from the user, a selection of one or more digital signs, of the subset of digital signs, on which to display content corresponding to an emergency event;
receive, from the user, information indicative of the emergency event, including an emergency message and an emergency level of the emergency event; and
based on the emergency level, interrupt the travel data being displayed on the one or more digital signs to cause the content corresponding to the emergency event to be displayed on the one or more digital signs.

15. The system of claim 14, wherein the interface depicts a graphical map that includes icons for the subset of digital signs, wherein the icons are depicted at locations on the graphical map corresponding to respective physical locations of the subset of digital signs.

16. The system of claim 15, wherein the interface provides a listing of the subset of digital signs that the user is authorized to access.

17. The system of claim 15, wherein causing the content corresponding to the emergency event to be displayed includes connecting to the one or more digital signs via a third-party digital sign control system.

18. The system of claim 15, wherein causing the content corresponding to the emergency event to be displayed includes causing the one or more digital signs to alternatingly display the travel data and the content corresponding to the emergency event based on a particular time interval.

19. The system of claim 14, wherein causing the content corresponding to the emergency event to be displayed includes completely preempting the travel data to cause the content corresponding to the emergency event to be displayed without interruption by the one or more digital signs.

20. The system of claim 19, wherein the computer system is further configured to receive, via the network interface, travel data indicating availability of at least one resource in a geographic region in which at least one of the plurality of digital signs in located.

* * * * *